US012792390B2

(12) United States Patent
(10) Patent No.: US 12,792,390 B2
(45) Date of Patent: Nov. 10, 2026
Dai et al.

(54) DATA PROCESSING METHOD AND APPARATUS

(71) Applicant: CLOUD INTELLIGENCE ASSETS HOLDING (SINGAPORE) PRIVATE LIMITED, Singapore (SG)

(72) Inventors: Shengdong Dai, Hangzhou (CN); Kaijie Guo, Hangzhou (CN); Ben Luo, Shanghai (CN)

(73) Assignee: CLOUD INTELLIGENCE ASSETS HOLDING (SINGAPORE) PRIVATE LIMITED, Singapore (SG)

( * ) Notice: Subject to any disclaimer, the term of this patent is extended or adjusted under 35 U.S.C. 154(b) by 270 days.

(21) Appl. No.: 18/846,205

(22) PCT Filed: Mar. 8, 2023

(86) PCT No.: PCT/CN2023/080336
§ 371 (c)(1),
(2) Date: Sep. 11, 2024

(87) PCT Pub. No.: WO2023/174126
PCT Pub. Date: Sep. 21, 2023

(65) Prior Publication Data

US 2025/0190238 A1 Jun. 12, 2025

(30) Foreign Application Priority Data

Mar. 17, 2022 (CN) ......................... 202210267806.1

(51) Int. Cl.
*G06F 9/455* (2018.01)
*G06F 9/38* (2018.01)
*G06F 9/50* (2006.01)

(52) U.S. Cl.
CPC ........ *G06F 9/45558* (2013.01); *G06F 9/3861* (2013.01); *G06F 9/5016* (2013.01); *G06F 2009/45583* (2013.01)

(58) Field of Classification Search
CPC ... G06F 2009/4557; G06F 2009/45579; G06F 2009/45583; G06F 2009/45591;
(Continued)

(56) References Cited

U.S. PATENT DOCUMENTS

| | | | |
|---|---|---|---|
| 2014/0201462 A1 | 7/2014 | Maharana et al. |
| 2017/0286115 A1 | 10/2017 | Coleman et al. |
| 2018/0060099 A1 | 3/2018 | Shanbhogue et al. |

FOREIGN PATENT DOCUMENTS

| | | |
|---|---|---|
| CN | 103955398 A | 7/2014 |
| CN | 110955512 A | 4/2020 |

(Continued)

OTHER PUBLICATIONS

International Search Report and Written Opinion dated Jun. 6, 2023 for International Application No. PCT/CN2023/080336.

(Continued)

*Primary Examiner* — Christopher Biagini

(57) ABSTRACT

The present application provides a data processing method and an apparatus. In the present application, if a first estimated number of executions of a cross-cache-line operation that a VCPU allocated to a virtual machine is expected to execute on a CPU of a host machine within a first time period later is greater than a preset threshold, a function that the CPU of the host machine throws an exception due to a memory access bus of the CPU being locked is disabled first, and then a state of a detection thread is switched from a silent state to an active state, so that the detection thread polls running data of the CPU recorded in a PMU corresponding to the CPU in the host machine, and acquires an
(Continued)

actual number of executions according to polled running data of the CPU.

20 Claims, 5 Drawing Sheets

(58) Field of Classification Search
CPC ......... G06F 2212/151; G06F 2212/152; G06F 9/3861; G06F 9/45533; G06F 9/45558; G06F 9/4881; G06F 9/5016; G06F 9/5077
See application file for complete search history.

(56) References Cited

FOREIGN PATENT DOCUMENTS

| | | |
|---|---|---|
| CN | 111124947 A | 5/2020 |
| CN | 112559049 A | 3/2021 |
| CN | 114595037 A | 6/2022 |

OTHER PUBLICATIONS

Notification to Grant Patent Right for Invention dated Mar. 7, 2025 for Chinese Application No. 202210267806.1.
Bin Shi et al. "Memory/Disk Operation Aware Lightweight VM Live Migration Across Data-centers with Low Performance Impact" Jun. 17, 2019, pp. 334-342.
Lina Wang et al. "Memory Bus Covert Channel Detection in Cloud Computing" Oct. 2016, pp. 418-424, vol. 62, No. 5, J. Wuhan Univ. (Nat.Sci. Ed.).

DATA PROCESSING METHOD AND APPARATUS

CROSS-REFERENCE TO RELATED APPLICATIONS

The present application is a National Stage of International Application No. PCT/CN2023/080336, filed on Mar. 8, 2023, which claims priority to Chinese patent application No. 202210267806.1, filed to China National Intellectual Property Administration on Mar. 17, 2022 and entitled "DATA PROCESSING METHOD AND APPARATUS". These applications are hereby incorporated by reference in their entireties.

TECHNICAL FIELD

The present application relates to the field of computer technologies and, in particular, to a data processing method and an apparatus.

BACKGROUND

With the rapid development of technologies, the application scope of virtualization technologies is becoming increasingly wide. Virtualization is a key technology in cloud computing, and the virtualization technologies can virtualize a physical machine (host machine) into one or more virtual machines. Each virtual machine has its own virtual hardware, for example, including a VCPU (Virtual Central Processing Unit), a virtual memory, and a virtual input/output I/O device, so as to form an independent virtual machine execution environment. The virtualization technologies are widely applied in fields such as cloud computing and high-performance computing due to high fault tolerance and high resource utilization.

In a virtualized environment, a VMM (Virtual Machine Management, virtual machine monitor) is a software management layer located between hardware of a host machine and a virtual machine, and is mainly responsible for managing the hardware of the host machine, such as managing a CPU (Central Processing Unit), a memory, and an I/O device of the host machine, and abstracting the hardware of the host machine into a corresponding virtual device interface for use by the virtual machine.

SUMMARY

The present application illustrates a data processing method and an apparatus.

In a first aspect, the present application illustrates a data processing method, applied to a host machine, where at least a virtual machine and a detection thread run in the host machine, and the method includes: predicting a first estimated number of executions of a cross-cache-line operation that a VCPU allocated to the virtual machine is expected to execute on a central processing unit CPU of the host machine within a first time period after a current moment; in a case that the first estimated number of executions is greater than or equal to a preset threshold, disabling a function that the CPU of the host machine throws an exception due to a memory access bus of the CPU being locked, so that the CPU of the host machine does not throw the exception in a case that the memory access bus of the CPU of the host machine is locked; and switching a state of the detection thread from a silent state to an active state, so that the detection thread polls running data of the CPU recorded in a performance monitoring unit PMU corresponding to the CPU in the host machine, and acquires, according to polled running data of the CPU, an actual number of executions of the cross-cache-line operation that the VCPU allocated to the virtual machine actually executes on the CPU of the host machine within the first time period.

In a second aspect, the present application illustrates a data processing apparatus, applied to a host machine, where at least a virtual machine and a detection thread run in the host machine, and the apparatus includes: a first prediction module, configured to predict a first estimated number of executions of a cross-cache-line operation that a VCPU allocated to the virtual machine is expected to execute on a central processing unit CPU of the host machine within a first time period after a current moment; a disabling module, configured to, in a case that the first estimated number of executions is greater than or equal to a preset threshold, disable a function that the CPU of the host machine throws an exception due to a memory access bus of the CPU being locked, so that the CPU of the host machine does not throw the exception in a case that the memory access bus of the CPU of the host machine is locked; a first switching module, configured to switch a state of the detection thread from a silent state to an active state; a polling module, configured to poll running data of the CPU recorded in a performance monitoring unit PMU corresponding to the CPU in the host machine; and an acquisition module, configured to acquire, according to polled running data of the CPU, an actual number of executions of the cross-cache-line operation that the VCPU allocated to the virtual machine actually executes on the CPU of the host machine within the first time period.

In a third aspect, the present application illustrates an electronic device, and the electronic device includes: a processor; a memory, configured to store processor-executable instructions; where the processor is configured to execute the method according to the first aspect.

In a fourth aspect, the present application illustrates a non-temporary computer-readable storage medium, and when instructions in the storage medium are executed by a processor of an electronic device, the electronic device is caused to execute the method according to the first aspect.

In a fifth aspect, the present application illustrates a computer program product, and when instructions in the computer program product are executed by a processor of an electronic device, the electronic device is caused to execute the method according to the first aspect.

Compared with the prior art, the present application includes the following advantages.

In the present application, the first estimated number of executions of the cross-cache-line operation that the VCPU allocated to the virtual machine is expected to execute on the CPU of the host machine within the first time period after the current moment is predicted. In the case that the first estimated number of executions is greater than or equal to the preset threshold, the function that the CPU of the host machine throws the exception due to the memory access bus of the CPU being locked is disabled, so that the CPU of the host machine does not throw the exception in the case that the memory access bus of the CPU of the host machine is locked. The state of the detection thread is switched from the silent state to the active state, so that the detection thread polls the running data of the CPU recorded in the PMU corresponding to the CPU in the host machine, and acquires, according to the polled running data of the CPU, the actual number of executions of the cross-cache-line operation that the VCPU allocated to the virtual machine actually executes on the CPU of the host machine within the first time period.

Through the present application, in a case that the VCPU allocated to the virtual machine executes the cross-cache-line operation on the CPU of the host machine frequently (such as tens of thousands or hundreds of thousands of times per second), in a scenario of detecting the actual number of executions of the cross-cache-line operation that the VCPU allocated to the virtual machine actually executes on the CPU of the host machine, the overall performance of the host machine and the performance of the virtual machine can be improved.

DESCRIPTION OF EMBODIMENTS

Figure 1:
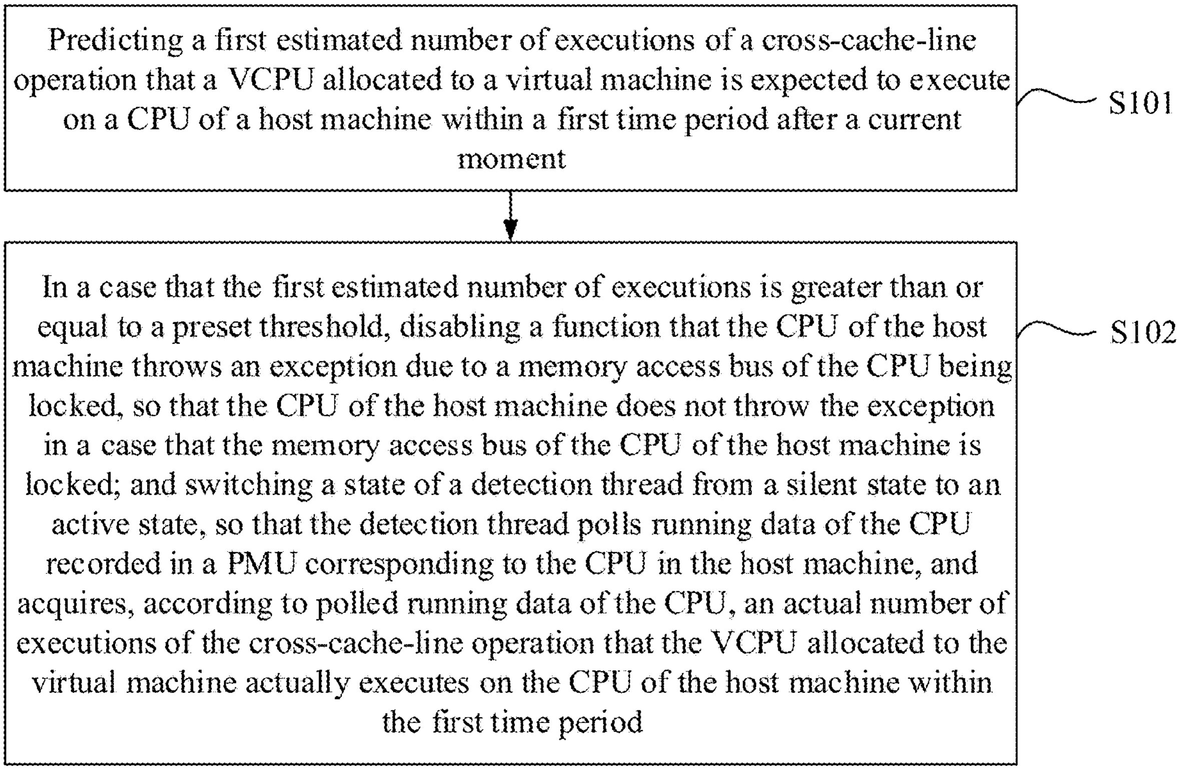
FIG. 1 is a step flowchart of a data processing method of the present application.

In order to make the above objectives, features, and advantages of the present application more obvious and more comprehensible, the present application is described in further detail below with reference to the accompanying drawings and specific implementations.

Sometimes, a CPU in a host machine allows misaligned memory access. In a scenario of misaligned memory access, an operand of an atomic operation will cross two cache lines of the CPU of the host machine (due to address misalignment). That is, one operation of accessing a cache of the CPU crosses two cache lines, which will trigger a split lock event.

For example, in an example, in the cache of the CPU, one cache line includes 64 bytes, one member of a struct counter occupies 8 bytes, and a buf fills 62 bytes. Therefore, once this member is accessed, a concatenation of contents of two cache lines is involved, and thus performing the atomic operation will trigger the split lock event.

However, in general, a cache coherence protocol can only guarantee consistency of cache line granularity. Accessing two cache lines simultaneously cannot guarantee the consistency of cache line granularity. To guarantee atomicity of split lock, a special logic (such as a cold path) may be used for processing in a case that an accessed operand crosses two cache lines, for example, locking a memory access bus (BUS LOCK) of the CPU of the host machine.

In a case that the memory access bus of the CPU of the host machine is locked, access to the memory access bus by other thread(s) in the host machine/other core(s) in the CPU of the host machine will be intercepted, resulting in an interruption of data processing process(es) of other thread(s) in the host machine/other core(s) in the CPU of the host machine.

Due to the interruption of data processing processes of other threads in the host machine/other cores in the CPU of the host machine, an average memory access delay of the CPU of the host machine may increase significantly, and since an execution of an action of "intercepting the access to the memory access bus by other threads in the host machine/other cores in the CPU of the host machine" may also consume some computing resources of the CPU of the host machine, the overall performance of the host machine will be reduced.

Thus, a requirement of improving the overall performance of the host machine is proposed.

In order to improve the overall performance of the host machine, in a possible manner, the average memory access delay of the CPU of the host machine may be reduced as much as possible, and the number of executions of the action of "intercepting the access to the memory access bus by other threads in the host machine/other cores in the CPU of the host machine" may be reduced as much as possible.

In order to achieve a purpose of "reducing the average memory access delay of the CPU of the host machine", in a manner, the number of interruptions of the data processing processes of other threads in the host machine/other cores in the CPU of the host machine may be reduced.

In order to achieve a purpose of "reducing the number of interruptions of the data processing processes of other threads in the host machine/other cores in the CPU of the host machine", in a manner, the number of interceptions of the access to the memory bus by other threads in the host machine/other cores in the CPU of the host machine may be reduced.

Reducing the number of interceptions of the access to the memory bus by other threads in the host machine/other cores in the CPU of the host machine can save the computing resources required for the actions of interception.

In order to achieve a purpose of "reducing the number of interceptions of the access to the memory bus by other threads in the host machine/other cores in the CPU of the host machine", in a manner, the number of times that the memory access bus of the CPU of the host machine is locked may be reduced.

In order to achieve a purpose of "reducing the number of times that the memory access bus of the CPU of the host machine is locked", in a manner, an actual number of executions of a cross-cache-line operation that a VCPU allocated to a virtual machine actually executes on the CPU of the host machine may be detected.

In a case that the actual number of executions of the cross-cache-line operation that the VCPU allocated to the virtual machine actually executes on the CPU of the host machine is high, some countermeasures may be taken to reduce the actual number of executions of the cross-cache-line operation that the VCPU allocated to the virtual machine actually executes on the CPU of the host machine afterward, so that the number of times that the memory access bus of the CPU of the host machine is locked afterward can be reduced.

Further, the number of interceptions of the access to the memory bus by other threads in the host machine/other cores in the CPU of the host machine afterward can be reduced, then the number of interruptions of the data processing processes of other threads in the host machine/other cores in the CPU of the host machine afterward can be reduced, and then the average memory access delay of the CPU of the host machine afterward can be reduced, so that a purpose of improving the overall performance of the host machine can be achieved.

The countermeasures may include reducing utilization of the CPU of the host machine by the virtual machine on the host machine or a frequency of access to the CPU of the host machine by the virtual machine, etc.

Based on the above analysis, it is important to detect the actual number of executions of the cross-cache-line operation that the VCPU allocated to the virtual machine actually executes on the CPU of the host machine.

Thus, a requirement of "detecting the actual number of executions of the cross-cache-line operation that the VCPU allocated to the virtual machine actually executes on the CPU of the host machine" is further proposed.

In order to achieve a purpose of "detecting the actual number of executions of the cross-cache-line operation that the VCPU allocated to the virtual machine actually executes on the CPU of the host machine", the inventors found that: in a case that the VCPU allocated to the virtual machine actually executes the cross-cache-line operation on the CPU of the host machine, the memory access bus of the CPU of the host machine will be locked, and when the memory access bus of the CPU of the host machine is locked, the CPU of the host machine will throw an exception, such as Bus Lock Exception or #DB Exception, etc.

A kernel-state VMM on the host machine is then required to handle the exception, so the host machine will exit from the virtual machine to the kernel-state VMM (for example, suspending the virtual machine and resuming running of the kernel-state VMM). After exiting to the kernel-state VMM (i.e., after resuming the running of the kernel-state VMM), the kernel-state VMM will attempt to handle the exception.

In a possible case, the kernel-state VMM may determine that the kernel-state VMM cannot handle the exception or that the exception should be handled by a user-state VMM, so the kernel-state VMM may notify the user-state VMM to handle the exception, and after receiving the notification, the user-state VMM will acquire the exception or attempt to handle the exception.

After obtaining the exception, the user-state VMM may also obtain relevant information of the exception (for example, a reason of the exception may be recorded within a shared area of the user-state VMM and the kernel-state VMM, from which it may be analyzed whether the reason of the exception is due to triggering of the split lock event, etc.), etc. According to the relevant information of the exception, whether the VCPU allocated to the virtual machine executes an operation across cache lines of the CPU of the host machine (whether the VCPU allocated to the virtual machine triggers the split lock event) may be determined, and the actual number of executions of the cross-cache-line operation that the VCPU allocated to the virtual machine actually executes on the CPU of the host machine is statistically analyzed by counting.

However, the inventors found that in the above manners, every time the VCPU allocated to the virtual machine executes the cross-cache-line operation on the CPU of the host machine, it will be resulted in that the CPU of the host machine throws the exception (Bus Lock Exception or #DB Exception, etc.), and then the host machine will exit (such as through a Vmexit function, etc.) from the virtual machine to the kernel-state VMM (such as suspending the virtual machine and resuming the running of the kernel-state VMM).

In a case that the VCPU allocated to the virtual machine executes the cross-cache-line operation on the CPU of the host machine frequently (such as tens of thousands or hundreds of thousands of times per second), on the one hand, it will cause the VMM in the host machine to frequently enter an exception handling process, thereby reducing the overall performance of the host machine, and will further indirectly cause the host machine to enter a state similar to being attacked by a DOS (Denial of Service Attack). On the other hand, the performance of the virtual machine may be reduced due to multiple exits from the virtual machine to the kernel-state VMM.

In view of this, the inventors considered that, in the case that the VCPU allocated to the virtual machine executes the cross-cache-line operation on the CPU of the host machine frequently (such as tens of thousands or hundreds of thousands of times per second), it is inappropriate to use the above manners to detect the actual number of executions of the cross-cache-line operation that the VCPU allocated to the virtual machine actually executes on the CPU of the host machine.

In this way, a requirement of "improving the overall performance of the host machine and improving the performance of the virtual machine in a scenario where it is required to detect the actual number of executions of the cross-cache-line operation that the VCPU allocated to the virtual machine actually executes on the CPU of the host machine, in the case that the VCPU allocated to the virtual machine executes the cross-cache-line operation on the CPU of the host machine frequently (such as tens of thousands or hundreds of thousands of times per second)" is proposed.

In order to achieve a purpose of "improving the overall performance of the host machine and improving the performance of the virtual machine in the scenario where it is required to detect the actual number of executions of the cross-cache-line operation that the VCPU allocated to the virtual machine actually executes on the CPU of the host machine, in the case that the VCPU allocated to the virtual machine executes the cross-cache-line operation on the CPU of the host machine frequently (such as tens of thousands or hundreds of thousands of times per second)", the inventors conducted statistical analysis on the above manners and found the following.

In the case that the memory access bus of the CPU of the host machine is locked, a function that the CPU of the host machine throws the exception has a function switch. The function switch may be turned on or off.

In combination with actual situations, if it is required that "in the case that the memory access bus of the CPU of the host machine is locked, the CPU of the host machine throws the exception", the function switch may be turned on. That is, by turning on the function switch, the function that the CPU of the host machine throws the exception in the case that the memory access bus of the CPU of the host machine is locked is enabled.

If it is required that "in the case that the memory access bus of the CPU of the host machine is locked, the CPU of the host machine does not throw the exception", the function switch may be turned off. That is, by turning off the function switch, the function that the CPU of the host machine throws the exception in the case that the memory access bus of the CPU of the host machine is locked is disabled.

In this way, the inventors found that the function switch can be turned off, so that in the case that the VCPU allocated to the virtual machine executes the cross-cache-line operation on the CPU of the host machine frequently (such as tens of thousands or hundreds of thousands of times per second), every time the memory access bus of the CPU of the host machine is locked, the CPU of the host machine will not be caused to throw the exception, thereby avoiding reducing the overall performance of the host machine and avoiding reducing the performance of the virtual machine.

However, although a purpose of "avoiding reducing the overall performance of the host machine and avoiding reducing the performance of the virtual machine" is achieved, since the CPU of the host machine does not throw the exception in the case that the memory access bus of the CPU of the host machine is locked, it will be resulted in that the actual number of executions of the cross-cache-line operation that the VCPU allocated to the virtual machine actually executes on the CPU of the host machine cannot be detected. Further, the purpose of "improving the overall performance of the host machine and improving the performance of the virtual machine in the scenario where it is required to detect the actual number of executions of the cross-cache-line operation that the VCPU allocated to the virtual machine actually executes on the CPU of the host machine, in the case that the VCPU allocated to the virtual machine executes the cross-cache-line operation on the CPU of the host machine frequently (such as tens of thousands or hundreds of thousands of times per second)" cannot be achieved.

In view of this, further, the inventors abandoned the detection manner in which "after obtaining the exception, the user-state VMM may also obtain the relevant information of the exception (for example, the reason of the exception may be recorded within the shared area of the user-state VMM and the kernel-state VMM, from which it may be analyzed whether the reason of the exception is due to triggering of the split lock event, etc.), etc.; and according to the relevant information of the exception, whether the VCPU allocated to the virtual machine executes the operation across cache lines of the CPU of the host machine (whether the VCPU allocated to the virtual machine triggers the split lock event) may be determined, and the actual number of executions of the cross-cache-line operation that the VCPU allocated to the virtual machine actually executes on the CPU of the host machine is statistically analyzed by counting" to detect the actual number of executions of the cross-cache-line operation that the VCPU allocated to the virtual machine actually executes on the CPU of the host machine, and instead think of creating a detection thread on the host machine, which is used to detect the actual number of executions of the cross-cache-line operation that the VCPU allocated to the virtual machine actually executes on the CPU of the host machine.

Specifically, referring to FIG. 1, a data processing method of the present application is shown. The method is applied to a host machine, where at least a virtual machine and a detection thread run in the host machine, and the method includes the following steps.

Step S101, predicting a first estimated number of executions of a cross-cache-line operation that a VCPU allocated to the virtual machine is expected to execute on a CPU of the host machine within a first time period after a current moment.

In the present application, executing the cross-cache-line operation on the CPU of the host machine will trigger a split lock event. In a case of triggering the split lock event, a memory access bus of the CPU of the host machine will be locked, thereby reducing the overall performance of the host machine.

In the present application, in order to improve the overall performance of the host machine, an actual number of executions of the cross-cache-line operation that the VCPU (which may be allocated to the virtual machine by a kernel-state VMM) allocated to the virtual machine actually executes on the CPU of the host machine may be detected. In a case that the actual number of executions of the cross-cache-line operation that the VCPU allocated to the virtual machine actually executes on the CPU of the host machine is relatively high, the number of executions of the cross-cache-line operation that the VCPU allocated to the virtual machine executes on the CPU of the host machine afterward is reduced through some countermeasures (such as reducing utilization of the CPU of the host machine by the virtual machine on the host machine afterward, or reducing a frequency of access to the CPU of the host machine by the virtual machine afterward, etc.), and thus the number of times of triggering the split lock event afterward is reduced, and in turn the number of times that the memory access bus of the CPU of the host machine is locked afterward is reduced, thereby improving the overall performance of the host machine afterward.

In an embodiment of the present application, in order to detect the actual number of executions of the cross-cache-line operation that the VCPU allocated to the virtual machine actually executes on the CPU of the host machine, the time can be divided into multiple time periods that are sequentially adjacent. Durations of the time periods may be the same, and adjacent time periods may be end-to-end. For example, in adjacent time periods, an end moment of an earlier time period may be the same as a beginning moment of a later time period.

The time period may be used as a benchmark time unit to detect the actual number of executions of the cross-cache-line operation that the VCPU allocated to the virtual machine actually executes on the CPU of the host machine. For example, actual numbers of executions of the cross-cache-line operation that the VCPU allocated to the virtual machine executes on the CPU of the host machine within the time periods respectively may be detected.

Of course, in a possible situation, a benchmark smaller than the time period may also be used to detect the actual number of executions of the cross-cache-line operation that the VCPU allocated to the virtual machine executes on the CPU of the host machine, so as to improve the real-time performance of detecting the actual number of executions of the cross-cache-line operation that the VCPU allocated to the virtual machine executes on the CPU of the host machine.

In view of this, in the present application, the actual number of executions of the cross-cache-line operation that the VCPU allocated to the virtual machine actually executes on the CPU of the host machine may be detected in at least two manners.

In order to determine an appropriate detection manner, in an embodiment, if it is required to detect an actual number of executions of the cross-cache-line operation that the VCPU allocated to the virtual machine actually executes on the CPU of the host machine within a time period, before that time period, an estimated number of executions of the cross-cache-line operation that the VCPU allocated to the virtual machine is expected to execute on the CPU of the host machine within that time period may be predicted first.

Then, referring to the predicted estimated number of executions of the cross-cache-line operation that the VCPU allocated to the virtual machine is expected to execute on the CPU of the host machine within that time period, one of the manners is selected to detect the actual number of executions of the cross-cache-line operation that the VCPU allocated to the virtual machine actually executes on the CPU of the host machine within that time period.

For example, a preset threshold may be set according to an actual situation.

In a case that the predicted estimated number of executions of the cross-cache-line operation that the VCPU allocated to the virtual machine is expected to execute on the CPU of the host machine within that time period is greater than or equal to the preset threshold, one of the manners may be used to detect the actual number of executions of the cross-cache-line operation that the VCPU allocated to the virtual machine actually executes on the CPU of the host machine within that time period. Or, in a case that the predicted estimated number of executions of the cross-cache-line operation that the VCPU allocated to the virtual machine is expected to execute on the CPU of the host machine within that time period is less than the preset threshold, another manner may be used to detect the actual number of executions of the cross-cache-line operation that the VCPU allocated to the virtual machine actually executes on the CPU of the host machine within that time period. For details, reference can be made to the description of subsequent steps, which will not be elaborated here.

For example, in an embodiment, there is the first time period after the current moment. Before detecting the actual number of executions of the cross-cache-line operation that the VCPU allocated to the virtual machine actually executes on the CPU of the host machine within the first time period, the first estimated number of executions of the cross-cache-line operation that the VCPU allocated to the virtual machine is expected to execute on the CPU of the host machine within the first time period after the current moment (which is the estimated number of executions, not the actual number of executions) may be predicted first, and then step S102 is executed.

Historical data may be used to predict the first estimated number of executions of the cross-cache-line operation that the VCPU allocated to the virtual machine is expected to execute on the CPU of the host machine within the first time period after the current moment.

The historical data may include a historical number of executions of the cross-cache-line operation that the VCPU allocated to the virtual machine actually executes on the CPU of the host machine within at least one historical time period before the current moment. Then, the first estimated number of executions of the cross-cache-line operation that the VCPU allocated to the virtual machine is expected to execute on the CPU of the host machine within the first time period after the current moment is acquired according to the historical data. For example, the historical data may be analyzed, so as to obtain, by analyzing, a rule of the historical number of executions of the cross-cache-line operation that the VCPU allocated to the virtual machine actually executes on the CPU of the host machine in a historical process, and to acquire, based on the rule, the first estimated number of executions of the cross-cache-line operation that the VCPU allocated to the virtual machine is expected to execute on the CPU of the host machine within the first time period after the current moment.

In an embodiment of the present application, the historical number of executions of the cross-cache-line operation that the VCPU allocated to the virtual machine actually executes on the CPU of the host machine within at least one historical time period before the current moment may be acquired, and then the first estimated number of executions of the cross-cache-line operation that the VCPU allocated to the virtual machine is expected to execute on the CPU of the host machine within the first time period after the current moment is acquired according to the historical number of executions.

Step S102, in the case that the first estimated number of executions is greater than or equal to the preset threshold, disabling a function that the CPU of the host machine throws an exception due to the memory access bus of the CPU being locked, so that the CPU of the host machine does not throw the exception in a case that the memory access bus of the CPU of the host machine is locked; and switching a state of the detection thread from a silent state to an active state, so that the detection thread polls running data of the CPU recorded in a PMU (Performance Monitoring Unit) corresponding to the CPU in the host machine, and acquires, according to polled running data of the CPU, the actual number of executions of the cross-cache-line operation that the VCPU allocated to the virtual machine actually executes on the CPU of the host machine within the first time period.

In an embodiment of the present application, disabling the function that the CPU of the host machine throws the exception due to the memory access bus of the CPU being locked and switching the state of the detection thread from the silent state to the active state may be executed in parallel.

Or, in another embodiment of the present application, the function that the CPU of the host machine throws the exception due to the memory access bus of the CPU being locked may be disabled first, and then the state of the detection thread is switched from the silent state to the active state.

Or, in another embodiment of the present application, the state of the detection thread may be switched from the silent state to the active state first, and then the function that the CPU of the host machine throws the exception due to the memory access bus of the CPU being locked is disabled.

Since the function that the CPU of the host machine throws the exception due to the memory access bus of the CPU being locked is disabled, the CPU of the host machine does not throw the exception in the case that the memory access bus of the CPU of the host machine is locked. However, since no exception is thrown, as analyzed above, it cannot be detected whether the VCPU allocated to the virtual machine actually executes the cross-cache-line operation on the CPU of the host machine, and then the actual number of executions of the cross-cache-line operation that the VCPU allocated to the virtual machine actually executes on the CPU of the host machine within the first time period cannot be detected.

Therefore, in a case that the function that the CPU of the host machine throws the exception due to the memory access bus of the CPU being locked is disabled, in order to not only avoid reducing the overall performance of the host machine and the performance of the virtual machine, but also be able to detect the actual number of executions of the cross-cache-line operation that the VCPU allocated to the virtual machine actually executes on the CPU of the host machine within the first time period, in the present application, the detection thread may be created in advance in the host machine, and the detection thread may be used to detect the actual number of executions of the cross-cache-line operation that the VCPU allocated to the virtual machine actually executes on the CPU of the host machine within the first time period.

The detection thread has multiple states, such as the silent state and the active state, etc.

The detection thread in the silent state does not work, and may be of low power consumption or low resource consumption, for example, may not occupy CPU overhead (computing resources) of the host machine.

The detection thread in the active state can work.

In an embodiment of the present application, if the state of the detection thread is the active state at this time, the state of the detection thread may not be switched. The detection thread will automatically poll the running data of the CPU recorded in the PMU corresponding to the CPU in the host machine, and acquire, according to the polled running data of the CPU, the actual number of executions of the cross-cache-line operation that the VCPU allocated to the virtual machine actually executes on the CPU of the host machine within the first time period.

After that, the detection thread may store the "actual number of executions of the cross-cache-line operation that the VCPU allocated to the virtual machine actually executes on the CPU of the host machine within the first time period" in a log, so that when the "actual number of executions of the cross-cache-line operation that the VCPU allocated to the virtual machine actually executes on the CPU of the host machine within the first time period" needs to be used later, the "actual number of executions of the cross-cache-line operation that the VCPU allocated to the virtual machine actually executes on the CPU of the host machine within the first time period" is retrieved from the log.

Or, in another embodiment of the present application, if the state of the detection thread is the silent state at this time, since the detection thread in the silent state does not work, and the actual number of executions of the cross-cache-line operation that the VCPU allocated to the virtual machine actually executes on the CPU of the host machine within the first time period cannot be detected based on the detection thread in the silent state, the state of the detection thread can be switched from the silent state to the active state. In this way, the detection thread will automatically poll the running data of the CPU recorded in the PMU corresponding to the CPU in the host machine, and acquire, according to the polled running data of the CPU, the actual number of executions of the cross-cache-line operation that the VCPU allocated to the virtual machine actually executes on the CPU of the host machine within the first time period.

After that, the detection thread may store the "actual number of executions of the cross-cache-line operation that the VCPU allocated to the virtual machine actually executes on the CPU of the host machine within the first time period" in the log, so that when the "actual number of executions of the cross-cache-line operation that the VCPU allocated to the virtual machine actually executes on the CPU of the host machine within the first time period" needs to be used later, the "actual number of executions of the cross-cache-line operation that the VCPU allocated to the virtual machine actually executes on the CPU of the host machine within the first time period" is retrieved from the log.

In the present application, the first estimated number of executions of the cross-cache-line operation that the VCPU allocated to the virtual machine is expected to execute on the CPU of the host machine within the first time period after the current moment is predicted. In the case that the first estimated number of executions is greater than or equal to the preset threshold, the function that the CPU of the host machine throws the exception due to the memory access bus of the CPU being locked is disabled, so that the CPU of the host machine does not throw the exception in the case that the memory access bus of the CPU of the host machine is locked. The state of the detection thread is switched from the silent state to the active state, so that the detection thread polls the running data of the CPU recorded in the PMU corresponding to the CPU in the host machine, and acquires, according to the polled running data of the CPU, the actual number of executions of the cross-cache-line operation that the VCPU allocated to the virtual machine actually executes on the CPU of the host machine within the first time period. Through the present application, in a case that the VCPU allocated to the virtual machine executes the cross-cache-line operation on the CPU of the host machine frequently (such as tens of thousands or hundreds of thousands of times per second), in a scenario of detecting the actual number of executions of the cross-cache-line operation that the VCPU allocated to the virtual machine actually executes on the CPU of the host machine, the overall performance of the host machine and the performance of the virtual machine can be improved.

In an embodiment of the present application, a kernel-state VMM and a user-state VMM also run in the host machine.

In this way, when predicting the first estimated number of executions of the cross-cache-line operation that the VCPU allocated to the virtual machine is expected to execute on the CPU of the host machine within the first time period after the current moment, it may be the user-state VMM that predicts the first estimated number of executions of the cross-cache-line operation that the VCPU allocated to the virtual machine is expected to execute on the CPU of the host machine within the first time period after the current moment.

Correspondingly, when disabling the function that the CPU of the host machine throws the exception due to the memory access bus of the CPU being locked, it may be that the user-state VMM sends a disabling request to the kernel-state VMM, where the disabling request is used to disable the function that the CPU of the host machine throws the exception due to the memory access bus of the CPU being locked.

In the case that the first estimated number of executions is greater than or equal to the preset threshold, as analyzed above, the VMM in the host machine frequently enters an exception handling process, which will reduce the overall performance of the host machine, and will result in reduction of the performance of the virtual machine due to multiple exits from the virtual machine to the kernel-state VMM.

Therefore, in order to avoid reducing the overall performance of the host machine and the overall performance of the virtual machine, as analyzed above, the function that the CPU of the host machine throws the exception due to the memory access bus of the CPU being locked may be disabled.

However, the function that the CPU of the host machine throws the exception due to the memory access bus of the CPU being locked is under the control of the kernel-state VMM, and the user-state VMM may not control the function that the CPU of the host machine throws the exception due to the memory access bus of the CPU being locked. Therefore, if the user-state VMM determines, in the case that the first estimated number of executions is greater than or equal to the preset threshold, that the function that the CPU of the host machine throws the exception due to the memory access bus of the CPU being locked needs to be disabled, the user-state VMM may request the kernel-state VMM to disable the function that the CPU of the host machine throws the exception due to the memory access bus of the CPU being locked.

For example, the user-state VMM sends the disabling request to the kernel-state VMM, where the disabling request is used to disable the function that the CPU of the host machine throws the exception due to the memory access bus of the CPU being locked.

In an embodiment of the present application, the user-state VMM may place the disabling request into a shared area (such as a shared memory page, etc.) of the user-state VMM and the kernel-state VMM, and then notify the kernel-state VMM.

Then, the kernel-state VMM receives the disabling request and disables, according to the disabling request, the function that the CPU of the host machine throws the exception due to the memory access bus of the CPU being locked.

In an embodiment of the present application, the kernel-state VMM may read the disabling request from the shared area of the user-state VMM and the kernel-state VMM after obtaining the notification.

The function that the CPU of the host machine throws the exception due to the memory access bus of the CPU being locked corresponds to a function switch. If the function switch is turned off, disabling the function that the CPU of the host machine throws the exception due to the memory access bus of the CPU being locked can be realized, and if the function switch is turned on, the function that the CPU of the host machine throws the exception due to the memory access bus of the CPU being locked can be enabled.

In this way, when disabling the function that the CPU of the host machine throws the exception due to the memory access bus of the CPU being locked according to the disabling request, the kernel-state VMM can turn off the function switch corresponding to the function that the CPU of the host machine throws the exception due to the memory access bus of the CPU being locked.

The kernel-state VMM may turn off the function switch through an externally exposed API (Application Programming Interface, application programming interface) of the function switch.

The detection thread may be a detection thread in a kernel state. Since the detection thread may be based on the kernel state, the user-state VMM may switch the state of the detection thread from the silent state to the active state via the kernel-state VMM. For example, the detection thread exposes an API to the outside, and the user-state VMM may send an activation request carrying the API to the kernel-state VMM, so that the kernel-state VMM switches the state of the detection thread from the silent state to the active state through the API.

For example, when switching the state of the detection thread from the silent state to the active state, it may be that the user-state VMM sends the activation request to the kernel-state VMM, where the activation request is used to request to switch the state of the detection thread from the silent state to the active state. Then, the kernel-state VMM receives the activation request, and switches the state of the detection thread from the silent state to the active state according to the activation request.

In another embodiment of the present application, after the kernel-state VMM disables the function that the CPU of the host machine throws the exception due to the memory access bus of the CPU being locked, the kernel-state VMM may send a disabling response to the user-state VMM, where the disabling response is used to notify that the function that the CPU of the host machine throws the exception due to the memory access bus of the CPU being locked has been disabled. In an embodiment of the present application, the kernel-state VMM may place the disabling response (processing result) into the shared area (such as the shared memory page) of the user-state VMM and the kernel-state VMM, and then notify the user-state VMM.

Then, the user-state VMM receives the disabling response, and then sends the activation request to the kernel-state VMM according to the disabling response. In an embodiment of the present application, after obtaining the notification, the user-state VMM may read the disabling response from the shared area of the user-state VMM and the kernel-state VMM, and learn according to the disabling response that the function that the CPU of the host machine throws the exception due to the memory access bus of the CPU being locked has been disabled.

In an embodiment of the present application, the detection thread polls the running data of the CPU recorded in the PMU corresponding to the CPU in the host machine, that is, the detection thread regularly acquires the running data of the CPU recorded in the PMU corresponding to the CPU in the host machine.

The running data, acquired each time, of the CPU recorded in the PMU corresponding to the CPU includes the number of executions of the cross-cache-line operation that the VCPU allocated to the virtual machine has already executed on the CPU of the host machine at a moment of acquiring the running data.

In this way, the actual number of executions of the cross-cache-line operation that the VCPU allocated to the virtual machine actually executes on the CPU of the host machine within the first time period may be acquired according to the number of executions of the cross-cache-line operation that the VCPU allocated to the virtual machine has already executed on the CPU of the host machine at a beginning moment of the first time period and the number of executions of the cross-cache-line operation that the VCPU allocated to the virtual machine has already executed on the CPU of the host machine at an end moment of the first time period.

For example, in an example, the polled running data of the CPU includes: a first number of executions of the cross-cache-line operation that the VCPU allocated to the virtual machine has already executed on the CPU of the host machine at the beginning moment of the first time period, and a second number of executions of the cross-cache-line operation that the VCPU allocated to the virtual machine has already executed on the CPU of the host machine at the end moment of the first time period.

In this way, when acquiring the actual number of executions according to the polled running data of the CPU, a difference between the second number of executions and the first number of executions may be calculated, and then the actual number of executions of the cross-cache-line operation that the VCPU allocated to the virtual machine actually executes on the CPU of the host machine within the first time period is acquired according to the difference. For example, the difference may be determined as the actual number of executions of the cross-cache-line operation that the VCPU allocated to the virtual machine actually executes on the CPU of the host machine within the first time period.

Through the present application, the actual number of executions of the cross-cache-line operation that the VCPU allocated to the virtual machine actually executes on the CPU of the host machine within the first time period can be obtained through the detection thread.

After that, it is required to enter a second time period after the first time period, and it is also required to detect an actual number of executions of the cross-cache-line operation that the VCPU allocated to the virtual machine actually executes on the CPU of the host machine within the second time period.

Figure 2:
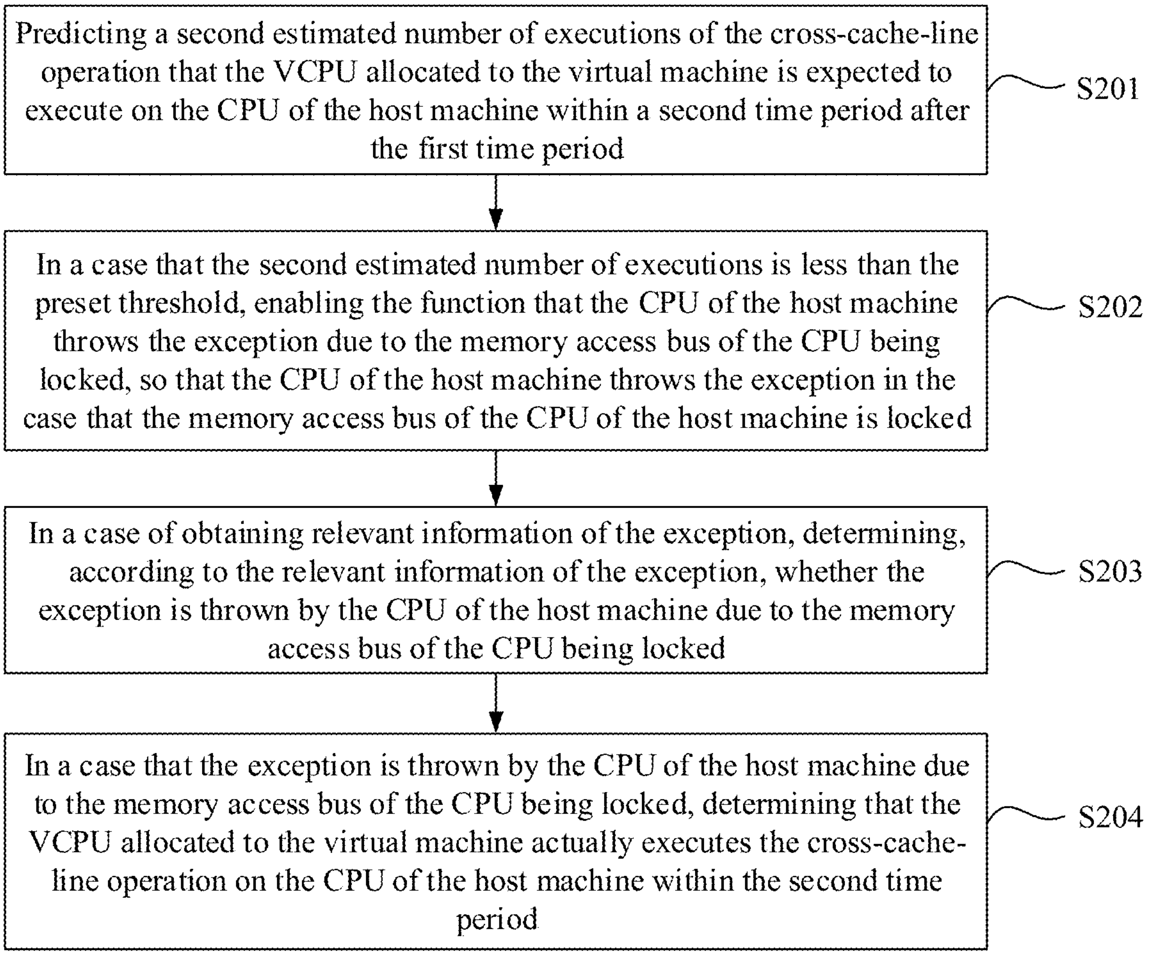
FIG. 2 is a step flowchart of a data processing method of the present application.

Referring to FIG. 2, a specific process may include the following steps.

Step S201, predicting a second estimated number of executions of the cross-cache-line operation that the VCPU allocated to the virtual machine is expected to execute on the CPU of the host machine within the second time period after the first time period.

Before detecting the actual number of executions of the cross-cache-line operation that the VCPU allocated to the virtual machine actually executes on the CPU of the host machine within the second time period, the second estimated number of executions of the cross-cache-line operation that the VCPU allocated to the virtual machine is expected to execute on the CPU of the host machine within the second time period (which is the estimated number of executions, not the actual number of executions) may be predicted first, and then step S202 is executed.

Historical data may be used to predict the second estimated number of executions of the cross-cache-line operation that the VCPU allocated to the virtual machine is expected to execute on the CPU of the host machine within the second time period.

The historical data may include a historical number of executions of the cross-cache-line operation that the VCPU allocated to the virtual machine actually executes on the CPU of the host machine within at least one historical time period before the current moment. Then, the second estimated number of executions of the cross-cache-line operation that the VCPU allocated to the virtual machine is expected to execute on the CPU of the host machine within the second time period after the current moment is acquired according to the historical data. For example, the historical data may be analyzed, so as to obtain, by analyzing, a rule of the historical number of executions of the cross-cache-line operation that the VCPU allocated to the virtual machine actually executes on the CPU of the host machine in a historical process, and to acquire, based on the rule, the second estimated number of executions of the cross-cache-line operation that the VCPU allocated to the virtual machine is expected to execute on the CPU of the host machine within the second time period after the current moment.

In the present application, the historical number of executions of the cross-cache-line operation that the VCPU allocated to the virtual machine actually executes on the CPU of the host machine within at least one historical time period before the current moment may be acquired, and then the second estimated number of executions of the cross-cache-line operation that the VCPU allocated to the virtual machine is expected to execute on the CPU of the host machine within the second time period after the current moment is acquired according to the historical number of executions.

Step S202, in a case that the second estimated number of executions is less than the preset threshold, enabling the function that the CPU of the host machine throws the exception due to the memory access bus of the CPU being locked, so that the CPU of the host machine throws the exception in the case that the memory access bus of the CPU of the host machine is locked.

In the present application, a specific manner of enabling the function that the CPU of the host machine throws the exception due to the memory access bus of the CPU being locked can be found in the following description and will not be described in detail here.

Step S203, in a case of obtaining relevant information of the exception, determining, according to the relevant information of the exception, whether the exception is thrown by the CPU of the host machine due to the memory access bus of the CPU being locked.

Step S204, in a case that the exception is thrown by the CPU of the host machine due to the memory access bus of the CPU being locked, determining that the VCPU allocated to the virtual machine actually executes the cross-cache-line operation on the CPU of the host machine within the second time period.

Further, the actual number of executions of the cross-cache-line operation that the VCPU allocated to the virtual machine actually executes on the CPU of the host machine may be statistically analyzed by counting.

In an embodiment of the present application, the kernel-state VMM and the user-state VMM also run in the host machine.

In this way, when predicting the second estimated number of executions of the cross-cache-line operation that the VCPU allocated to the virtual machine is expected to execute on the CPU of the host machine within the second time period after the first time period, it may be the user-state VMM that predicts the second estimated number of executions of the cross-cache-line operation that the VCPU allocated to the virtual machine is expected to execute on the CPU of the host machine within the second time period after the first time period.

Correspondingly, when enabling the function that the CPU of the host machine throws the exception due to the memory access bus of the CPU being locked, it may be that the user-state VMM sends an enabling request to the kernel-state VMM, where the enabling request is used to enable the function that the CPU of the host machine throws the exception due to the memory access bus of the CPU being locked.

In a case that the second estimated number of executions is less than the preset threshold, as analyzed above, although the VMM in the host machine will enter the exception handling process, it will not frequently enter the exception handling process. Therefore, a degree of reduction of the overall performance of the host machine is not large. In addition, although the exiting from the virtual machine to the kernel-state VMM will occur, the exiting to the kernel-state VMM will not frequently occur. Therefore, a degree of reduction of the performance of the virtual machine is not large. Therefore, the degree of reduction of the overall performance of the host machine and the degree of reduction of the performance of the virtual machine caused by "the VMM will not frequently enter the exception handling process and the exiting from the virtual machine to the kernel-state VMM will not frequently occur" are often tolerable.

In another aspect, the detection thread polls the running data of the CPU recorded in the PMU corresponding to the CPU in the host machine, that is, the detection thread regularly acquires the running data of the CPU recorded in the PMU corresponding to the CPU in the host machine. Due to an influence of a "regular" cycle (a time interval between two adjacent polls), it is often that the actual number of executions of the cross-cache-line operation that the VCPU allocated to the virtual machine actually executes on the CPU of the host machine within one cycle can only be obtained with an interval of "one cycle", which will affect the timeliness of acquiring the actual number of executions of the cross-cache-line operation that the VCPU allocated to the virtual machine executes on the CPU of the host machine (for example, the division for the time periods described above cannot be freely performed according to an actual situation, the division for the time periods may only be performed according to the "regular" cycle, and the minimum duration included in the time period may only be the "regular" cycle, which cannot be any smaller, thereby reducing the timeliness).

Therefore, in the case that the second estimated number of executions is less than the preset threshold, the degree of reduction of the overall performance of the host machine and the degree of reduction of the performance of the virtual machine caused by "the VMM will not frequently enter the exception handling process and the exiting from the virtual machine to the kernel-state VMM will not frequently occur" are often tolerable, so in order to improve the timeliness of the acquired actual number of executions of the cross-cache-line operation that the VCPU allocated to the virtual machine actually executes on the CPU of the host machine, it may be accepted to use the detection manner in which "after obtaining the exception, the user-state VMM may also obtain the relevant information of the exception (for example, the reason of the exception may be recorded within the shared area of the user-state VMM and the kernel-state VMM, from which it may be analyzed whether the reason of the exception is due to triggering of the split lock event, etc.), etc.; and according to the relevant information of the exception, whether the VCPU allocated to the virtual machine executes the operation across cache lines of the CPU of the host machine (whether the VCPU allocated to the virtual machine triggers the split lock event) may be determined, and the actual number of executions of the cross-cache-line operation that the VCPU allocated to the virtual machine actually executes on the CPU of the host machine is statistically analyzed by counting" to detect the actual number of executions of the cross-cache-line operation that the VCPU allocated to the virtual machine actually executes on the CPU of the host machine.

In this way, it is required to enable the function that the CPU of the host machine throws the exception due to the memory access bus of the CPU being locked.

However, the function that the CPU of the host machine throws the exception due to the memory access bus of the CPU being locked is under the control of the kernel-state VMM, and the user-state VMM may not control the function that the CPU of the host machine throws the exception due to the memory access bus of the CPU being locked. Therefore, if the user-state VMM determines, in the case that the second estimated number of executions is less than the preset threshold, that the function that the CPU of the host machine throws the exception due to the memory access bus of the CPU being locked needs to be enabled, the user-state VMM may request the kernel-state VMM to enable the function that the CPU of the host machine throws the exception due to the memory access bus of the CPU being locked.

For example, the user-state VMM sends the enabling request to the kernel-state VMM, where the enabling request is used to enable the function that the CPU of the host machine throws the exception due to the memory access bus of the CPU being locked.

In an embodiment of the present application, the user-state VMM may place the enabling request into the shared area (such as the shared memory page) of the user-state VMM and the kernel-state VMM, and then notify the kernel-state VMM.

Then, the kernel-state VMM receives the enabling request, and enables the function that the CPU of the host machine throws the exception due to the memory access bus of the CPU being locked according to the enabling request.

In an embodiment of the present application, the kernel-state VMM may read the enabling request from the shared area of the user-state VMM and the kernel-state VMM after obtaining the notification.

The function that the CPU of the host machine throws the exception due to the memory access bus of the CPU being locked corresponds to the function switch. If the function switch is turned off, disabling the function that the CPU of the host machine throws the exception due to the memory access bus of the CPU being locked can be realized, and if the function switch is turned on, the function that the CPU of the host machine throws the exception due to the memory access bus of the CPU being locked can be enabled.

In this way, when enabling the function that the CPU of the host machine throws the exception due to the memory access bus of the CPU being locked according to the enabling request, the kernel-state VMM can turn on the function switch corresponding to the function that the CPU of the host machine throws the exception due to the memory access bus of the CPU being locked.

The kernel-state VMM may turn on the function switch through the externally exposed API of the function switch.

Correspondingly, when determining, according to the relevant information of the exception, whether the exception is thrown by the CPU of the host machine due to the memory access bus of the CPU being locked, it may be that the user-state VMM determines, according to the relevant information of the exception, whether the exception is thrown by the CPU of the host machine due to the memory access bus of the CPU being locked.

Correspondingly, when determining that the VCPU allocated to the virtual machine actually executes the cross-cache-line operation on the CPU of the host machine within the second time period, it may be the user-state VMM that determines that the VCPU allocated to the virtual machine actually executes the cross-cache-line operation on the CPU of the host machine within the second time period.

Further, since in the case that the second estimated number of executions is less than the preset threshold, the detection thread may not be used to detect the actual number of executions of the cross-cache-line operation that the VCPU allocated to the virtual machine actually executes on the CPU of the host machine within the second time period. Therefore, the state of the detection thread may be switched from the active state to the silent state.

For example, the kernel-state VMM and the user-state VMM also run in the host machine.

In this way, when switching the state of the detection thread from the active state to the silent state, in an embodiment, the user-state VMM may send a silence request to the kernel-state VMM, where the silence request is used to request to switch the state of the detection thread from the active state to the silent state. The kernel-state VMM may receive the silence request, and switches the state of the detection thread from the active state to the silent state according to the silence request.

Or, in another embodiment, the detection thread may directly request the kernel-state VMM to switch the state of the detection thread from the active state to the silent state, and the present application does not limit a specific switching manner.

Figure 3:
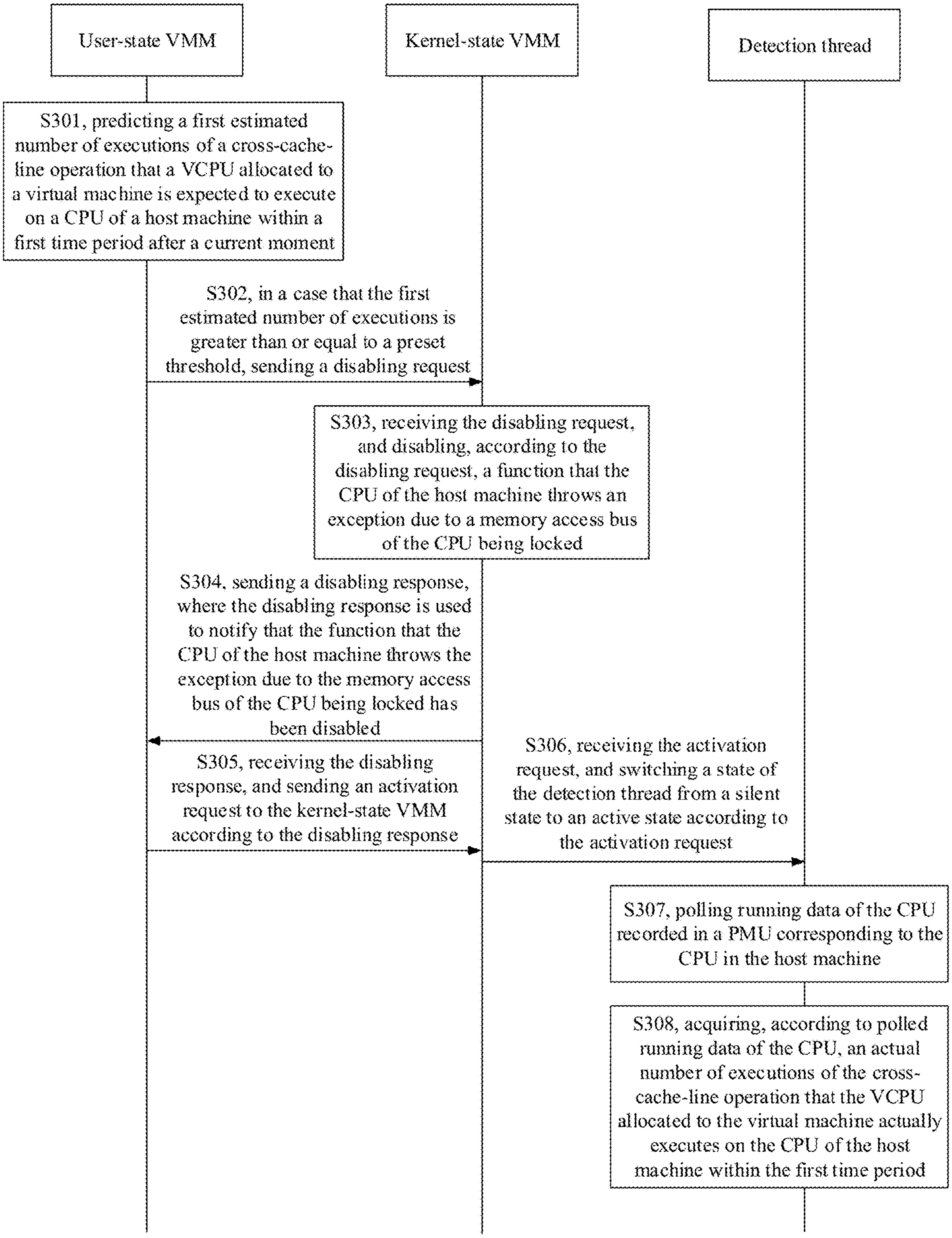
FIG. 3 is a step flowchart of a data processing method of the present application.

Referring to FIG. 3, the present solution is illustrated by taking an embodiment as an example, which is not used as a restriction on the protection scope of the present solution.

Specifically, this embodiment includes the following process.

Step S301, a user-state VMM predicts a first estimated number of executions of a cross-cache-line operation that a VCPU allocated to a virtual machine is expected to execute on a CPU of a host machine within a first time period after a current moment.

Step S302, in a case that the first estimated number of executions is greater than or equal to a preset threshold, the user-state VMM sends a disabling request to a kernel-state VMM, where the disabling request is used to disable a function that the CPU of the host machine throws an exception due to a memory access bus of the CPU being locked, so that the CPU of the host machine does not throw the exception in a case that the memory access bus of the CPU of the host machine is locked.

Step S303, the kernel-state VMM receives the disabling request, and disables, according to the disabling request, the function that the CPU of the host machine throws the exception due to the memory access bus of the CPU being locked.

Step S304, the kernel-state VMM sends a disabling response to the user-state VMM, where the disabling response is used to notify that the function that the CPU of the host machine throws the exception due to the memory access bus of the CPU being locked has been disabled.

Step S305, the user-state VMM receives the disabling response, and sends an activation request to the kernel-state VMM, where the activation request is used to request to switch a state of a detection thread from a silent state to an active state.

Step S306, the kernel-state VMM receives the activation request, and switches the state of the detection thread from the silent state to the active state according to the activation request.

Step S307, in a case that the state of the detection thread is switched to the active state, the detection thread polls running data of the CPU recorded in a PMU corresponding to the CPU in the host machine.

Step S308, the detection thread acquires, according to polled running data of the CPU, an actual number of executions of the cross-cache-line operation that the VCPU allocated to the virtual machine actually executes on the CPU of the host machine within the first time period.

In the present application, the user-state VMM predicts the first estimated number of executions of the cross-cache-line operation that the VCPU allocated to the virtual machine is expected to execute on the CPU of the host machine within the first time period after the current moment. In the case that the first estimated number of executions is greater than or equal to the preset threshold, the user-state VMM sends the disabling request to the kernel-state VMM, where the disabling request is used to disable the function that the CPU of the host machine throws the exception due to the memory access bus of the CPU being locked, so that the CPU of the host machine does not throw the exception in the case that the memory access bus of the CPU of the host machine is locked. The kernel-state VMM receives the disabling request, and disables the function that the CPU of the host machine throws the exception due to the memory access bus of the CPU being locked according to the disabling request. The kernel-state VMM sends the disabling response to the user-state VMM, where the disabling response is used to notify that the function that the CPU of the host machine throws the exception due to the memory access bus of the CPU being locked has been disabled. The user-state VMM receives the disabling response, and sends the activation request to the kernel-state VMM according to the disabling response, where the activation request is used to request to switch the state of the detection thread from the silent state to the active state. The kernel-state VMM receives the activation request, and switches the state of the detection thread from the silent state to the active state according to the activation request. In the case that the state of the detection thread is switched to the active state, the detection thread polls the running data of the CPU recorded in the PMU corresponding to the CPU in the host machine. The detection thread acquires the actual number of executions of the cross-cache-line operation that the VCPU allocated to the virtual machine actually executes on the CPU of the host machine within the first time period, according to the polled running data of the CPU. Through the present application, in the case that the VCPU allocated to the virtual machine executes the cross-cache-line operation on the CPU of the host machine frequently (such as tens of thousands or hundreds of thousands of times per second), in the scenario of detecting the actual number of executions of the cross-cache-line operation that the VCPU allocated to the virtual machine actually executes on the CPU of the host machine, the overall performance of the host machine and the performance of the virtual machine can be improved.

It should be noted that for simplicity of description, the method embodiments are expressed as a series of action combinations. However, those skilled in the art should know that the present application is not limited by the order of the described actions, as according to the present application, certain steps may be performed in other orders or simultaneously. Secondly, those skilled in the art should also know that the embodiments described in the specification belong to some embodiments, and actions involved may not necessarily be necessary for the present application.

Figure 4:
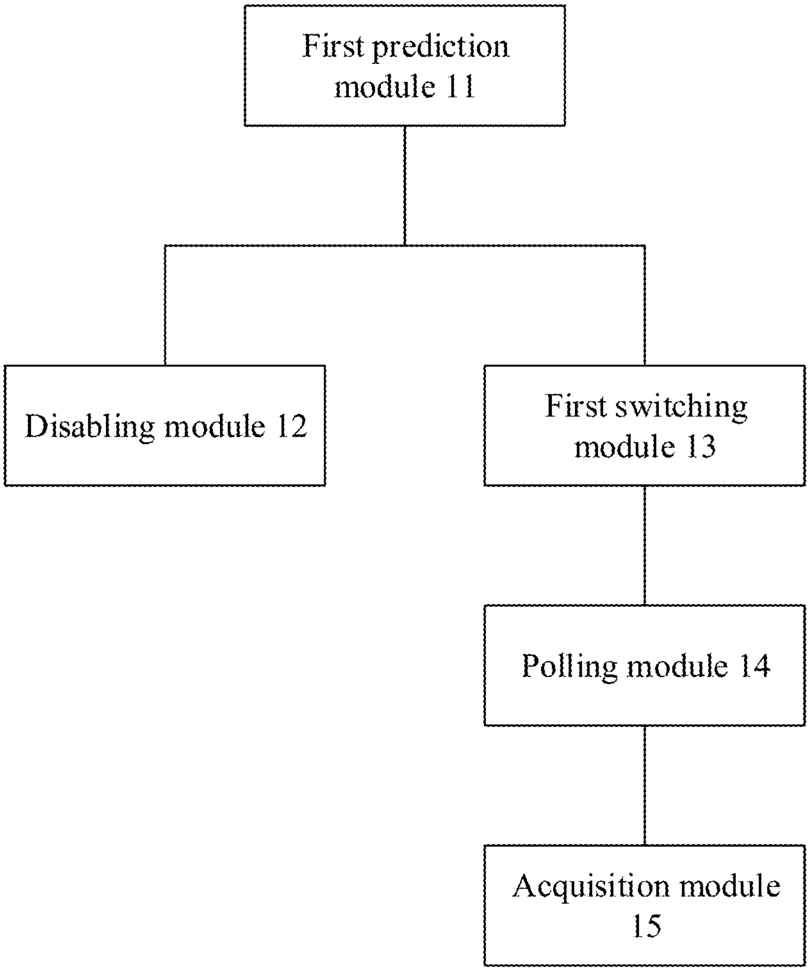
FIG. 4 is a structural block diagram of a data processing apparatus of the present application.

Referring to FIG. 4, a structural block diagram of a data processing apparatus of the present application is shown. The data processing apparatus is applied to a host machine, where at least a virtual machine and a detection thread run in the host machine, and the apparatus includes:

a first prediction module 11, configured to predict a first estimated number of executions of a cross-cache-line operation that a VCPU allocated to the virtual machine is expected to execute on a central processing unit CPU of the host machine within a first time period after a current moment; a disabling module 12, configured to, in a case that the first estimated number of executions is greater than or equal to a preset threshold, disable a function that the CPU of the host machine throws an exception due to a memory access bus of the CPU being locked, so that the CPU of the host machine does not throw the exception in a case that the memory access bus of the CPU of the host machine is locked; a first switching module 13, configured to switch a state of the detection thread from a silent state to an active state; a polling module 14, configured to poll running data of the CPU recorded in a performance monitoring unit PMU corresponding to the CPU in the host machine; and an acquisition module 15, configured to acquire, according to polled running data of the CPU, an actual number of executions of the cross-cache-line operation that the VCPU allocated to the virtual machine actually executes on the CPU of the host machine within the first time period.

In an implementation, a kernel-state VMM and a user-state VMM also run in the host machine. The first prediction module includes a first prediction unit of the user-state VMM, and the first prediction unit is configured to predict the first estimated number of executions of the cross-cache-line operation that the VCPU allocated to the virtual machine is expected to execute on the central processing unit CPU of the host machine within the first time period after the current moment. Correspondingly, the disabling module includes a first sending unit included in the user-state VMM, and further includes a first receiving unit and a disabling unit included in the kernel-state VMM. The first sending unit is configured to send a disabling request to the first receiving unit, where the disabling request is used to disable the function; the first receiving unit is configured to receive the disabling request, and the disabling unit is configured to disable the function according to the disabling request.

In an implementation, the first switching module includes: a second sending unit included in the user-state VMM, and further includes a second receiving unit and a first switching unit included in the kernel-state VMM. The second sending unit is configured to send an activation request to the second receiving unit, where the activation request is used to request to switch the state of the detection thread from the silent state to the active state; the second receiving unit is configured to receive the activation request, and the first switching unit is configured to switch the state of the detection thread from the silent state to the active state according to the activation request.

In an implementation, the first switching module further includes: a third sending unit included in the kernel-state VMM, and further includes a third receiving unit included in the user-state VMM. The third sending unit is configured to send a disabling response to the third receiving unit, where the disabling response is used to notify that the function has been disabled; the third receiving unit is configured to receive the disabling response, and the second sending unit is further configured to send the activation request to the second receiving unit according to the disabling response.

In an implementation, the apparatus further includes: a second prediction module, configured to predict a second estimated number of executions of the cross-cache-line operation that the VCPU allocated to the virtual machine is expected to execute on the CPU of the host machine within a second time period after the first time period; an enabling module, configured to enable the function in a case that the second estimated number of executions is less than the preset threshold, so that the CPU of the host machine throws the exception in the case that the memory access bus of the CPU of the host machine is locked; a first determination module, configured to, in a case of obtaining relevant information of the exception, determine, according to the relevant information of the exception, whether the exception is thrown by the CPU of the host machine due to the memory access bus of the CPU being locked; a second determination module, configured to, in a case that the exception is thrown by the CPU of the host machine due to the memory access bus of the CPU being locked, determine that the VCPU allocated to the virtual machine actually executes the cross-cache-line operation on the CPU of the host machine within the second time period.

In an implementation, a kernel-state VMM and a user-state VMM also run in the host machine. The second prediction module includes: a second prediction unit of the user-state VMM, and the second prediction unit is configured to predict the second estimated number of executions of the cross-cache-line operation that the VCPU allocated to the virtual machine is expected to execute on the CPU of the host machine within the second time period after the first time period. Correspondingly, the enabling module includes: a fourth sending unit included in the user-state VMM, and further includes a fourth receiving unit and an enabling unit included in the kernel-state VMM. The fourth sending unit is configured to send an enabling request to the fourth receiving unit, where the enabling request is used to enable the function; the fourth receiving unit is configured to receive the enabling request, and the enabling unit is configured to enable the function according to the enabling request.

In an implementation, the first determination module further includes a first determination unit included in the user-state VMM, and the first determination unit is configured to determine, according to the relevant information of the exception, whether the exception is thrown by the CPU of the host machine due to the memory access bus of the CPU being locked. Correspondingly, the second determination module includes a second determination unit included in the user-state VMM, and the second determination unit is configured to determine that the VCPU allocated to the virtual machine actually executes the cross-cache-line operation on the CPU of the host machine within the second time period.

In an implementation, the apparatus further includes: a second switching module, configured to, in a case that the second estimated number of executions is less than the preset threshold, switch the state of the detection thread from the active state to the silent state.

In an implementation, a kernel-state VMM and a user-state VMM also run in the host machine. The second switching module includes a fifth sending unit included in the user-state VMM, and further includes a fifth receiving unit and a second switching unit included in the kernel-state VMM. The fifth sending unit is included and configured to send a silence request to the fifth receiving unit, where the silence request is used to request to switch the state of the detection thread from the active state to the silent state; the fifth receiving unit is configured to receive the silence request, and the second switching unit is configured to switch the state of the detection thread from the active state to the silent state according to the silence request.

In an implementation, the first prediction module includes: a first acquisition unit, configured to acquire a historical number of executions of the cross-cache-line operation that the VCPU allocated to the virtual machine actually executes on the CPU of the host machine within at least one historical time period before the current moment; a second acquisition unit, configured to acquire the first estimated number of executions according to the historical number of executions.

In an implementation, the polled running data of the CPU includes: a first number of executions of the cross-cache-line operation that the VCPU allocated to the virtual machine has executed on the CPU of the host machine at a beginning moment of the first time period, and a second number of executions of the cross-cache-line operation that the VCPU allocated to the virtual machine has executed on the CPU of the host machine at an end moment of the first time period. The acquisition module includes: a calculation unit, configured to calculate a difference between the second number of executions and the first number of executions; a third acquisition unit, configured to acquire the actual number of executions according to the difference.

In the present application, the first estimated number of executions of the cross-cache-line operation that the VCPU allocated to the virtual machine is expected to execute on the CPU of the host machine within the first time period after the current moment is predicted. In the case that the first estimated number of executions is greater than or equal to the preset threshold, the function that the CPU of the host machine throws the exception due to the memory access bus of the CPU being locked is disabled, so that the CPU of the host machine does not throw the exception in the case that the memory access bus of the CPU of the host machine is locked. The state of the detection thread is switched from the silent state to the active state, so that the detection thread polls the running data of the CPU recorded in the PMU corresponding to the CPU in the host machine, and acquires, according to the polled running data of the CPU, the actual number of executions of the cross-cache-line operation that the VCPU allocated to the virtual machine actually executes on the CPU of the host machine within the first time period. Through the present application, in the case that the VCPU allocated to the virtual machine executes the cross-cache-line operation on the CPU of the host machine frequently (such as tens of thousands or hundreds of thousands of times per second), in the scenario of detecting the actual number of executions of the cross-cache-line operation that the VCPU allocated to the virtual machine actually executes on the CPU of the host machine, the overall performance of the host machine and the performance of the virtual machine can be improved.

An embodiment of the present application further provides a non-volatile readable storage medium. The non-volatile readable storage medium stores one or more modules (programs), and when the one or more modules are applied to a device, the device may be caused to execute instructions of method steps in the embodiments of the present application.

An embodiment of the present application provides one or more machine-readable media having instructions stored thereon, and when the instructions are executed by one or more processors, an electronic device is caused to execute the method according to one or more of the above embodiments. In the embodiment of the present application, the electronic device includes a server, a gateway, a sub device, etc., and the sub device is a device such as an Internet of Things device.

The embodiments of the present disclosure may be implemented as an apparatus configured desirably using any suitable hardware, firmware, software, or any combination thereof, and the apparatus may include a server (cluster), a terminal device such as an IoT device, and other electronic devices.

Figure 5:
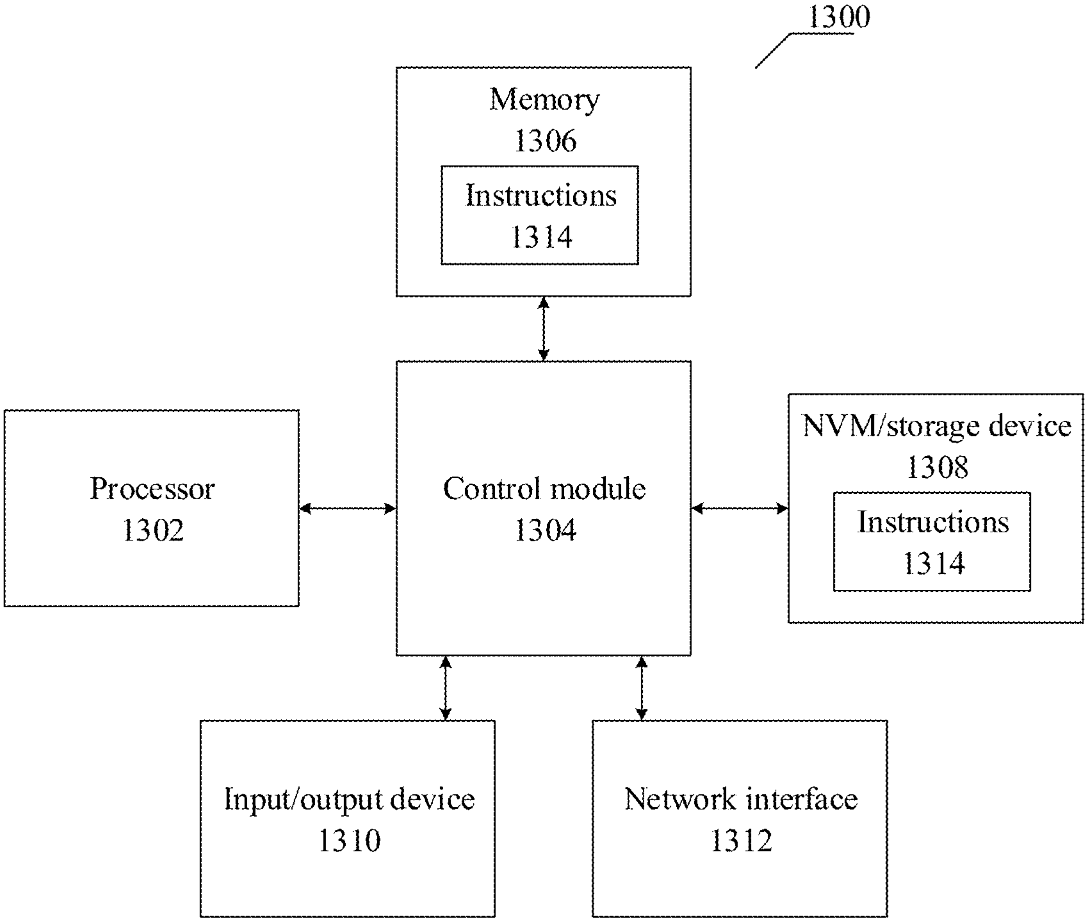
FIG. 5 is a structural block diagram of an apparatus of the present application.

FIG. 5 schematically illustrates an exemplary apparatus 1300 that may be used to implement various embodiments of the present application.

For an embodiment, FIG. 5 illustrates an exemplary apparatus 1300, and the apparatus includes one or more processors 1302, a control module (chipset) 1304 coupled to at least one of the (one or more) processors 1302, a memory 1306 coupled to the control module 1304, a non-volatile memory (NVM)/storage device 1308 coupled to the control module 1304, one or more input/output devices 1310 coupled to the control module 1304, and a network interface 1312 coupled to the control module 1304.

The processor 1302 may include one or more single-core or multi-core processors, and the processor 1302 may include any combination of general-purpose processors or special-purpose processors (such as a graphics processor, an application processor, a baseband processor, etc.). In some embodiments, the apparatus 1300 can serve as a gateway or other server devices in the embodiments of the present application.

In some embodiments, the apparatus 1300 may include one or more computer-readable media with instructions 1314 (such as the memory 1306 or the NVM/storage device 1308) and one or more processors 1302 which are combined with the one or more computer-readable media and configured to execute the instructions 1314 to implement modules so as to execute the actions of the present disclosure.

For an embodiment, the control module 1304 may include any suitable interface controller to provide any suitable interface to at least one of the (one or more) processors 1302 and/or any suitable device or component in communication with the control module 1304.

The control module 1304 may include a memory controller module to provide an interface to the memory 1306. The memory controller module may be a hardware module, a software module, and/or a firmware module.

The memory 1306 may be used, for example, to load and store data and/or the instructions 1314 for the apparatus 1300. For an embodiment, the memory 1306 may include any suitable volatile memory, such as a suitable dynamic random access memory (DRAM). In some embodiments, the memory 1306 may include a double data rate four synchronous dynamic random-access memory (DDR4SDRAM).

For an embodiment, the control module 1304 may include one or more input/output controllers to provide interfaces to the NVM/storage device 1308 and the (one or more) input/output devices 1310.

For example, the NVM/storage device 1308 may be used to store data and/or the instructions 1314. The NVM/storage device 1308 may include any suitable non-volatile memory (e.g., a flash memory) and/or may include any suitable (one or more) non-volatile storage devices (e.g., one or more hard disk drives (HDDs), one or more compact disk (CD) drives, and/or one or more digital versatile disk (DVD) drives).

The NVM/storage device 1308 may include storage resources that are physically part of the device on which the apparatus 1300 is installed, or may be accessible by the device but not necessarily serve as part of the device. For example, the NVM/storage device 1308 may be accessed through a network via the (one or more) input/output devices 1310.

The (one or more) input/output devices 1310 may provide interfaces for the apparatus 1300 to communicate with any other suitable device, and the input/output devices 1310 may include a communication component, a pinyin component, a sensor component, etc. The network interface 1312 may provide an interface for the apparatus 1300 for communication through one or more networks, and the apparatus 1300 may communicate wirelessly with one or more components of a wireless network according to any one or more wireless network standards and/or protocols, such as accessing a wireless network based on a communication standard, such as WiFi, 2G, 3G, 4G, 5G, etc., or a combination of them for wireless communication.

For an embodiment, at least one of the (one or more) processors 1302 may be logically packaged with one or more controllers (e.g., memory controller modules) of the control module 1304. For an embodiment, at least one of the (one or more) processors 1302 may be logically packaged with the one or more controllers of the control module 1304 to form a system in package (SiP). For an embodiment, at least one of the (one or more) processors 1302 may be logically integrated on a same mold with the one or more controllers of the control module 1304. For an embodiment, at least one of the (one or more) processors 1302 may be logically integrated on a same mold with the one or more controllers of the control module 1304 to form a system on chip (SoC).

In various embodiments, the apparatus 1300 may be, but is not limited to, a server, a desktop computing device, or a mobile computing device (such as a laptop computing device, a handheld computing device, a tablet, a netbook, etc.) or other terminal devices. In various embodiments, the apparatus 1300 may have more or fewer components and/or different architectures. For example, in some embodiments, the apparatus 1300 may include one or more cameras, keyboards, liquid crystal display (LCD) screens (including touchscreen displays), non-volatile memory ports, multiple antennas, graphics chips, application specific integrated circuits (ASICs), and speakers.

An embodiment of the present application provides an electronic device, including: one or more processors, and one or more machine-readable media having instructions stored thereon, and when the instructions are executed by the one or more processors, the electronic device is caused to execute one or more methods in the present application.

For the apparatus embodiments, since they are basically similar to the method embodiments, the description is relatively simple, and for relevant sections, reference can be made to the description of the method embodiments section.

The various embodiments of the present specification are described in a progressive manner, and each embodiment focuses on differences from other embodiments. Reference for the same and similar sections between the embodiments can be made to each other.

The embodiments of the present application are described with reference to flowcharts and/or block diagrams of the methods, terminal devices (systems), and computer program products according to the embodiments of the present application. It should be understood that each flow and/or block in the flowcharts and/or block diagrams, and combinations of flows and/or blocks in the flowcharts and/or block diagrams may be implemented by computer program instructions. These computer program instructions may be provided to a processor of a general-purpose computer, a special-purpose computer, an embedded processor, or other programmable information processing terminal devices to generate a machine, so that the instructions executed by the processor of the computer or the other programmable information processing terminal devices generate an apparatus for implementing functions specified in one or more flows of the flowcharts and/or one or more blocks of the block diagrams.

These computer program instructions may also be stored in a computer-readable memory that can guide the computer or the other programmable information processing terminal devices to work in a specific manner, so that the instructions stored in the computer-readable memory generate a manufacture including an instruction apparatus, and the instruction apparatus implements functions specified in one or more flows of the flowcharts and/or one or more blocks of the block diagrams.

These computer program instructions may also be loaded onto the computer or the other programmable information processing terminal devices, so that a series of operation steps are executed on the computer or the other programmable terminal devices to generate computer-implemented processing, and thus the instructions executed on the processor of the computer or the other programmable terminal devices provide steps for implementing functions specified in one or more flows of the flowcharts and/or one or more blocks of the block diagrams.

Although preferred embodiments of the present application are described, those skilled in the art may make additional changes and modifications to these embodiments once they know basic inventive concepts. Therefore, the appended claims are intended to be interpreted as including preferred embodiments and all changes and modifications falling within the scope of the embodiments of the present application.

Finally, it should be noted that in this specification, relational terms such as first and second are only used to distinguish one entity or operation from another entity or operation, and do not necessarily require or imply that there is any actual relationship or order between these entities or operations. Moreover, terms "including", "comprising", or any other variation thereof are intended to cover non-exclusive inclusion, such that a process, method, article or terminal device including a series of elements not only includes those elements, but also includes other elements that are not explicitly listed, or also includes elements inherent to such process, method, article or terminal device. Without further limitations, an element defined by a statement "including a . . . " does not exclude the existence of other identical elements in the process, method, article or terminal device including that element.

The data processing method and the apparatus provided by the present application are described in detail above, and specific examples are used to describe the principles and implementations of the present application. The description of the above embodiments is only used to help understand the methods and core ideas of the present application. At the same time, for those of ordinary skill in the art, there will be changes in the specific implementations and the application scope according to the ideas of the present application. In summary, the content of the present specification should not be construed as a limitation to the present application.

The invention claimed is:

1. A data processing method, applied to a host machine, wherein at least a virtual machine and a detection thread run in the host machine, and the method comprises:

predicting a first estimated number of executions of a cross-cache-line operation that a virtual central processing unit (VCPU) allocated to the virtual machine is expected to execute on a central processing unit (CPU) of the host machine within a first time period after a current moment;

in a case that the first estimated number of executions is greater than or equal to a preset threshold, disabling a function that the CPU of the host machine throws an exception due to a memory access bus of the CPU being locked, so that the CPU of the host machine does not throw the exception in a case that the memory access bus of the CPU of the host machine is locked; and switching a state of the detection thread from a silent state to an active state, so that the detection thread polls running data of the CPU recorded in a performance monitoring unit (PMU) corresponding to the CPU in the host machine, and acquires, according to polled running data of the CPU, an actual number of executions of the cross-cache-line operation that the VCPU allocated to the virtual machine actually executes on the CPU of the host machine within the first time period.

2. The method according to claim 1, wherein a kernel-state virtual machine monitor (VMM) and a user-state VMM also run in the host machine;

predicting the first estimated number of executions of the cross-cache-line operation that the VCPU allocated to the virtual machine is expected to execute on the CPU of the host machine within the first time period after the current moment comprises:

predicting, by the user-state VMM, the first estimated number of executions of the cross-cache-line operation that the VCPU allocated to the virtual machine is expected to execute on the CPU of the host machine within the first time period after the current moment;

correspondingly, disabling the function that the CPU of the host machine throws the exception due to the memory access bus of the CPU being locked comprises:

sending, by the user-state VMM, a disabling request to the kernel-state VMM, wherein the disabling request is used to disable the function;

receiving, by the kernel-state VMM, the disabling request, and disabling the function according to the disabling request.

3. The method according to claim 2, wherein switching the state of the detection thread from the silent state to the active state comprises:

sending, by the user-state VMM, an activation request to the kernel-state VMM, wherein the activation request is used to request to switch the state of the detection thread from the silent state to the active state;

receiving, by the kernel-state VMM, the activation request, and switching the state of the detection thread from the silent state to the active state according to the activation request.

4. The method according to claim 3, further comprising:

sending, by the kernel-state VMM, a disabling response to the user-state VMM, wherein the disabling response is used to notify that the function has been disabled;

receiving, by the user-state VMM, the disabling response, and executing, according to the disabling response, the step of sending the activation request to the kernel-state VMM.

5. The method according to claim 1, further comprising:

predicting a second estimated number of executions of the cross-cache-line operation that the VCPU allocated to the virtual machine is expected to execute on the CPU of the host machine within a second time period after the first time period;

in a case that the second estimated number of executions is less than the preset threshold, enabling the function, so that the CPU of the host machine throws the exception in the case that the memory access bus of the CPU of the host machine is locked;

in a case of obtaining relevant information of the exception, determining, according to the relevant information of the exception, whether the exception is thrown by the CPU of the host machine due to the memory access bus of the CPU being locked;

in a case that the exception is thrown by the CPU of the host machine due to the memory access bus of the CPU being locked, determining that the VCPU allocated to the virtual machine actually executes the cross-cache-line operation on the CPU of the host machine within the second time period.

6. The method according to claim 5, wherein a kernel-state VMM and a user-state VMM also run in the host machine;

predicting the second estimated number of executions of the cross-cache-line operation that the VCPU allocated to the virtual machine is expected to execute on the CPU of the host machine within the second time period after the first time period comprises:

predicting, by the user-state VMM, the second estimated number of executions of the cross-cache-line operation that the VCPU allocated to the virtual machine is expected to execute on the CPU of the host machine within the second time period after the first time period;

correspondingly, enabling the function comprises:

sending, by the user-state VMM, an enabling request to the kernel-state VMM, wherein the enabling request is used to enable the function;

receiving, by the kernel-state VMM, the enabling request, and enabling the function according to the enabling request.

7. The method according to claim 6, wherein determining, according to the relevant information of the exception, whether the exception is thrown by the CPU of the host machine due to the memory access bus of the CPU being locked comprises:

determining, by the user-state VMM and according to the relevant information of the exception, whether the exception is thrown by the CPU of the host machine due to the memory access bus of the CPU being locked;

correspondingly, determining that the VCPU allocated to the virtual machine actually executes the cross-cache-line operation on the CPU of the host machine within the second time period comprises:

determining, by the user-state VMM, that the VCPU allocated to the virtual machine actually executes the cross-cache-line operation on the CPU of the host machine within the second time period.

8. The method according to claim 5, further comprising:

in the case that the second estimated number of executions is less than the preset threshold, switching the state of the detection thread from the active state to the silent state.

9. The method according to claim 8, wherein a kernel-state VMM and a user-state VMM also run in the host machine;

switching the state of the detection thread from the active state to the silent state comprises:

sending, by the user-state VMM, a silence request to the kernel-state VMM, wherein the silence request is used to request to switch the state of the detection thread from the active state to the silent state;

receiving, by the kernel-state VMM, the silence request, and switching the state of the detection thread from the active state to the silent state according to the silence request.

10. The method according to claim 1, wherein predicting the first estimated number of executions of the cross-cache-line operation that the VCPU allocated to the virtual machine is expected to execute on the CPU of the host machine within the first time period after the current moment comprises:

acquiring a historical number of executions of the cross-cache-line operation that the VCPU allocated to the virtual machine actually executes on the CPU of the host machine within at least one historical time period before the current moment;

acquiring the first estimated number of executions according to the historical number of executions.

11. The method according to claim 1, wherein the polled running data of the CPU comprises: a first number of executions of the cross-cache-line operation that the VCPU allocated to the virtual machine has executed on the CPU of the host machine at a beginning moment of the first time period, and a second number of executions of the cross-cache-line operation that the VCPU allocated to the virtual machine has executed on the CPU of the host machine at an end moment of the first time period;

acquiring, according to the polled running data of the CPU, the actual number of executions of the cross-cache-line operation that the VCPU allocated to the virtual machine actually executes on the CPU of the host machine within the first time period comprises:

calculating a difference between the second number of executions and the first number of executions;

acquiring the actual number of executions according to the difference.

12. An electronic device, comprising a memory, a processor, and a computer program stored on the memory and capable of running on the processor, wherein when the processor executes the program, the processor is enabled to:

predict a first estimated number of executions of a cross-cache-line operation that a virtual central processing unit (VCPU) allocated to the virtual machine is expected to execute on a central processing unit (CPU) of the host machine within a first time period after a current moment;

in a case that the first estimated number of executions is greater than or equal to a preset threshold, disable a function that the CPU of the host machine throws an exception due to a memory access bus of the CPU being locked, so that the CPU of the host machine does not throw the exception in a case that the memory access bus of the CPU of the host machine is locked; and switch a state of the detection thread from a silent state to an active state, so that the detection thread polls running data of the CPU recorded in a performance monitoring unit (PMU) corresponding to the CPU in the host machine, and acquires, according to polled running data of the CPU, an actual number of executions of the cross-cache-line operation that the VCPU allocated to the virtual machine actually executes on the CPU of the host machine within the first time period.

13. The electronic device according to claim 12, wherein a kernel-state virtual machine monitor (VMM) and a user-state VMM also run in the host machine;

wherein when the processor executes the computer program, the processor is enabled to:

predict the first estimated number of executions of the cross-cache-line operation that the VCPU allocated to the virtual machine is expected to execute on the CPU of the host machine within the first time period after the current moment;

send a disabling request to the kernel-state VMM, wherein the disabling request is used to disable the function;

receive the disabling request, and disabling the function according to the disabling request.

14. The electronic device according to claim 13, wherein when the processor executes the computer program, the processor is enabled to:

send an activation request to the kernel-state VMM, wherein the activation request is used to request to switch the state of the detection thread from the silent state to the active state;

receive the activation request, and switching the state of the detection thread from the silent state to the active state according to the activation request.

15. The electronic device according to claim 14, wherein when the processor executes the computer program, the processor is further enabled to:

send a disabling response to the user-state VMM, wherein the disabling response is used to notify that the function has been disabled;

receive the disabling response, and executing, according to the disabling response, the step of sending the activation request to the kernel-state VMM.

16. The electronic device according to claim 12, wherein when the processor executes the computer program, the processor is further enabled to:

predict a second estimated number of executions of the cross-cache-line operation that the VCPU allocated to the virtual machine is expected to execute on the CPU of the host machine within a second time period after the first time period;

in a case that the second estimated number of executions is less than the preset threshold, enable the function, so that the CPU of the host machine throws the exception in the case that the memory access bus of the CPU of the host machine is locked;

in a case of obtaining relevant information of the exception, determine, according to the relevant information of the exception, whether the exception is thrown by the CPU of the host machine due to the memory access bus of the CPU being locked;

in a case that the exception is thrown by the CPU of the host machine due to the memory access bus of the CPU being locked, determine that the VCPU allocated to the virtual machine actually executes the cross-cache-line operation on the CPU of the host machine within the second time period.

17. The electronic device according to claim 16, wherein a kernel-state VMM and a user-state VMM also run in the host machine;

wherein when the processor executes the computer program, the processor is further enabled to:

predict the second estimated number of executions of the cross-cache-line operation that the VCPU allocated to the virtual machine is expected to execute on the CPU of the host machine within the second time period after the first time period;

send an enabling request to the kernel-state VMM, wherein the enabling request is used to enable the function;

receive the enabling request, and enabling the function according to the enabling request.

18. The electronic device according to claim 17, wherein when the processor executes the computer program, the processor is further enabled to:

determine, according to the relevant information of the exception, whether the exception is thrown by the CPU of the host machine due to the memory access bus of the CPU being locked;

determine that the VCPU allocated to the virtual machine actually executes the cross-cache-line operation on the CPU of the host machine within the second time period.

19. The electronic device according to claim 12, wherein when the processor executes the computer program, the processor is further enabled to:

in the case that the second estimated number of executions is less than the preset threshold, switch the state of the detection thread from the active state to the silent state.

20. A non-transitory computer-readable storage medium, wherein the computer-readable storage medium stores a computer program, and the following steps are implemented when a processor executes the computer program:

predicting a first estimated number of executions of a cross-cache-line operation that a virtual central processing unit (VCPU) allocated to the virtual machine is expected to execute on a central processing unit (CPU) of the host machine within a first time period after a current moment;

in a case that the first estimated number of executions is greater than or equal to a preset threshold, disabling a function that the CPU of the host machine throws an exception due to a memory access bus of the CPU being locked, so that the CPU of the host machine does not throw the exception in a case that the memory access bus of the CPU of the host machine is locked; and switching a state of the detection thread from a silent state to an active state, so that the detection thread polls running data of the CPU recorded in a performance monitoring unit (PMU) corresponding to the CPU in the host machine, and acquires, according to polled running data of the CPU, an actual number of executions of the cross-cache-line operation that the VCPU allocated to the virtual machine actually executes on the CPU of the host machine within the first time period.

* * * * *